United States Patent
Harrison

(10) Patent No.: US 10,739,438 B2
(45) Date of Patent: Aug. 11, 2020

(54) SUPER-RESOLUTION RADAR FOR AUTONOMOUS VEHICLES

(71) Applicant: Metawave Corporation, Palo Alto, CA (US)

(72) Inventor: Matthew Paul Harrison, Palo Alto, CA (US)

(73) Assignee: Matthew Paul Harrison, Palo Alto, CA (US)

(*) Notice: Subject to any disclaimer, the term of this patent is extended or adjusted under 35 U.S.C. 154(b) by 0 days.

(21) Appl. No.: 16/447,032

(22) Filed: Jun. 20, 2019

(65) Prior Publication Data
US 2019/0391235 A1    Dec. 26, 2019

Related U.S. Application Data

(60) Provisional application No. 62/687,790, filed on Jun. 20, 2018.

(51) Int. Cl.
*G01S 7/41* (2006.01)
*G01S 7/03* (2006.01)
(Continued)

(52) U.S. Cl.
CPC ............... *G01S 7/417* (2013.01); *G01S 7/03* (2013.01); *G01S 7/4052* (2013.01);
(Continued)

(58) Field of Classification Search
CPC .................................. G01S 7/417; G01S 7/03
See application file for complete search history.

(56) References Cited

U.S. PATENT DOCUMENTS

| 10,410,322 B2* | 9/2019 | Viswanathan | G06T 3/4092 |
| 2013/0241765 A1* | 9/2013 | Kozma | G01S 13/56 342/107 |

(Continued)

OTHER PUBLICATIONS

S. Patole, et al., "Automotive Radars: A Review of Signal Processing Techniques, Signal Processing for Smart Vehicle Technologies: Part 2," in IEEE Signal Processing Magazine, pp. 22-35, Mar. 2017.

(Continued)

*Primary Examiner* — Marcus E Windrich
(74) *Attorney, Agent, or Firm* — Sandra Lynn Godsey

(57) ABSTRACT

Examples disclosed herein relate to an autonomous driving system in an ego vehicle. The autonomous driving system includes a radar system configured to detect a target in a path and a surrounding environment of the ego vehicle and produce radar data with a first resolution that is gathered over a continuous field of view on the detected target. The system includes a super-resolution network configured to receive the radar data with the first resolution and produce radar data with a second resolution different from the first resolution using first neural networks. The system also includes a target identification module configured to receive the radar data with the second resolution and to identify the detected target from the radar data with the second resolution using second neural networks. Other examples disclosed herein include a method of operating the radar system in the autonomous driving system of the ego vehicle.

20 Claims, 10 Drawing Sheets

(51) Int. Cl.
G01S 7/40 (2006.01)
H01Q 1/32 (2006.01)
H01Q 1/36 (2006.01)
G01S 13/86 (2006.01)

(52) U.S. Cl.
CPC ......... G01S 13/865 (2013.01); H01Q 1/3233 (2013.01); H01Q 1/36 (2013.01); G01S 2007/4082 (2013.01)

(56) References Cited

U.S. PATENT DOCUMENTS

| | | | |
|---|---|---|---|
| 2018/0232947 A1* | 8/2018 | Nehmadi | G01S 13/89 |
| 2019/0272620 A1* | 9/2019 | Seip | G06N 3/08 |
| 2019/0361454 A1* | 11/2019 | Zeng | B60W 50/0098 |
| 2019/0361456 A1* | 11/2019 | Zeng | G01C 21/20 |
| 2019/0370666 A1* | 12/2019 | Ros Sanchez | G06T 5/50 |

OTHER PUBLICATIONS

F. Fölster, et al., "Signal Processing Structure For Automotive Radar," Frequenz, vol. 60, Issue 1-2, pp. 20-24, 2006.
O. Ronneberger, et al. "U-Net: Convolutional Networks for Biomedical Image Segmentation", arXiv:1505.04597 [cs.CV], pp. 1-8, May 2015.
G. Liu et al., "Image Inpainting for Irregular Holes Using Partial Convolutions," arXiv:1804:07723 [cs.Cv], pp. 1-23, Apr. 2018.
J. Leonard, et al., "A Perception-Driven Autonomous Urban Vehicle," In: Buehler M., Iagnemma K., Singh S. (eds), The DARPA Urban Challenge, Springer Tracts in Advanced Robotics, Springer, Berlin, Heidelberg, vol. 56., pp. 163-230, 2009.
J. Lin, et al., "Design of an FMCW Radar Baseband Signal Processing System for Automotive Application," Springer Plus, 5:42, pp. 4-16, Jan. 2016.
P. Molchanov, "Radar Target Classification by Micro-Doppler Contributions," Thesis for the degree of Doctor of Science in Technology, Tampere University of Technology, Tampere, Finland, Publication 1255, pp. 1-187, Oct. 2014.
O.R.E. Fogle, "Human Micro-Range/Micro-Doppler Signature Extraction, Association, and Statistical Characterization for High-Resolution Radar," Ph.D. dissertation, Dept. of Electrical Engineering, Wright State University, Celina, Ohio, pp. 1-80, 2011.
S. Park, et al., "A Neural Network Approach to Target Classification for Active Safety System Using Microwave Radar," Expert Systems with Applications, Elsevier, vol. 37, Issue 3, pp. 2340-2346, Mar. 2010.
J. Lombacher, et al., "Potential of Radar for Static Object Classification Using Deep Learning Methods," 2016 IEEE MTT-S International Conference on Microwaves for Intelligent Mobility (ICMIM), San Diego, CA, pp. 1-4, May 2016.
A. Angelov, et al., "Practical Classification of Different Moving Targets Using Automotive Radar and Deep Neural Networks," in IET Radar, Sonar & Navigation, vol. 12, No. 10, pp. 1082-1089, Sep. 2018.
S. Haykin, "Radar Vision," IEEE International Conference on Radar, Arlington, VA, pp. 585-588, May 1990.
J. Schoebel, et al., "Planar Antenna Technology for mm-Wave Automotive Radar, Sensing, and Communications," Radar Technology, Book edited by: Dr. Guy Kouemou, ISBN 978-953-307-029-2, In Tech, Ch 15, pp. 298-319, Jan. 2010.
T. Thayaparan, et al., "Micro-Doppler Radar Signatures for Intelligent Target Recognition," Technical memo, Defence R&D Canada, Ottawa, Ontario, Canada, pp. 1-59, Sep. 2004.
N. Visnevski, et al., "Syntactic Modeling and Signal Processing of Multifunction Radars: A Stochastic Context-Free Grammar Approach," in Proceedings of the IEEE, vol. 95, No. 5, pp. 1000-1025, May 2007.

* cited by examiner

SUPER-RESOLUTION RADAR FOR AUTONOMOUS VEHICLES

CROSS-REFERENCE TO RELATED APPLICATIONS

This application claims priority from U.S. Provisional Application No. 62/687,790, titled "SUPER-RESOLUTION RADAR FOR AUTONOMOUS VEHICLES," filed on Jun. 20, 2018, and incorporated herein by reference in its entirety.

BACKGROUND

Autonomous driving is quickly moving from the realm of science fiction to becoming an achievable reality. Already in the market are Advanced-Driver Assistance Systems (ADAS) that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify targets in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A super-resolution radar for autonomous vehicles is disclosed. The super-resolution radar is suitable for many different applications and can be deployed in a variety of different environments and configurations. In various examples, the super-resolution radar is used in an autonomous driving vehicle to identify and classify targets in the surrounding environment in all-weather conditions and beyond line-of-sight. The targets may include structural elements in the environment such as roads, walls, buildings, road center medians and other objects, as well as other vehicles, pedestrians, bystanders, cyclists, plants, trees, animals and so on. As described in more detail below, the super-resolution radar has a super-resolution network to increase the resolution of radar data gathered over a continuous Field of View (FoV). The super-resolution network is trained to map radar data into time synchronized lidar scans.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
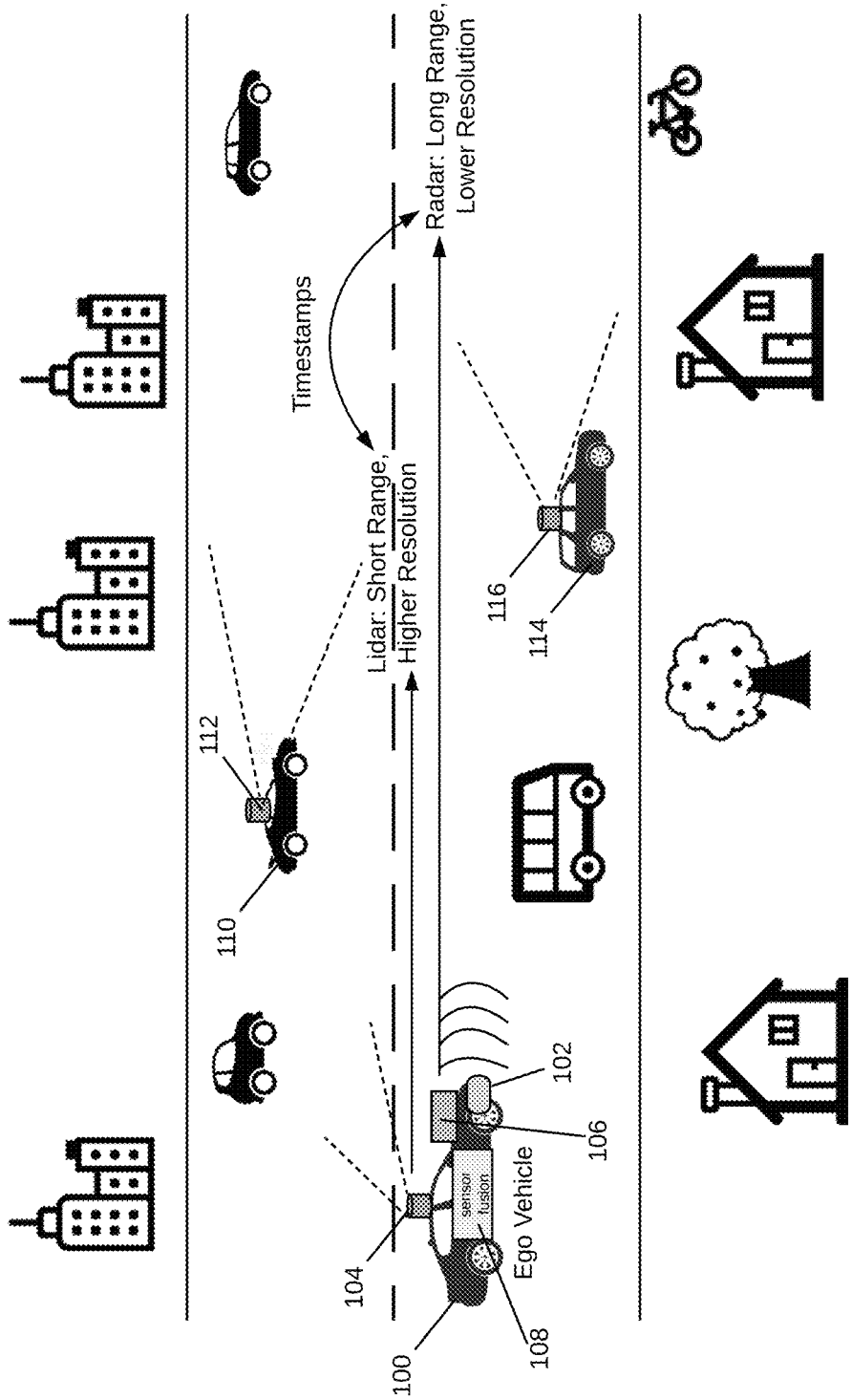
FIG. 1 illustrates a schematic diagram of example environment in which a super-resolution radar in an autonomous vehicle radar is used to detect and identify targets.

FIG. 1 illustrates a schematic diagram of example environment in which a super-resolution radar in an autonomous vehicle radar is used to detect and identify targets. Ego vehicle 100 is an autonomous vehicle having multiple perception sensors, including camera 102, lidar 104, and radar 106, among others. Camera sensor 102 may be used to detect visible targets and conditions and to assist in the performance of various functions. The lidar sensor 104 can also be used to detect targets outside the ego vehicle 100 and provide this information to adjust control of the vehicle. This information may include information such as congestion on a highway, road conditions, and other conditions that would impact the sensors, actions or operations of the vehicle. Camera sensors are currently used in ADAS to assist drivers in driving functions such as parking (e.g., in rear view cameras). Cameras can capture texture, color and contrast information at a high level of detail, but similar to the human eye, they are susceptible to adverse weather conditions and variations in lighting. Camera 102 may have a high resolution but may not capture images of targets beyond 50 meters.

Lidar sensors measure the distance to an object by calculating the time taken by a pulse of light to travel to an object and back to the sensor. When positioned on top of a vehicle, lidar sensors can provide a 360° three-dimensional (3D) view of the surrounding environment. However, lidar sensors, such as lidar 104, are still prohibitively expensive, bulky in size, sensitive to weather conditions and are limited to short ranges (e.g., less than 150-200 meters), with resolution decreasing with range. Radar sensors, on the other hand, have been used in vehicles for many years and operate in all-weather conditions. Radar sensors also use far less processing than the other types of sensors and have the advantage of detecting targets behind obstacles and determining the speed of moving targets. When it comes to resolution, lidars as the laser beams are focused on small areas, have a smaller wavelength than RF signals and can achieve around 0.25 degrees of resolution. As used herein, the term "resolution" refers to the degree of granularity visible in an image or a representation of sensor data.

In various examples and as described in more detail below, radar 106 is an iMTM radar system capable of providing a 360° true 3D vision and human-like interpretation of the ego vehicle's path and surrounding environment. The iMTM radar system is capable of shaping and steering radio frequency (RF) beams in all directions in a 360° FoV and recognizing targets quickly with a high degree of accuracy over a long range of around 300 meters or more. The short-range capabilities of camera 102 and lidar 104 and the long-range capabilities of radar 106 enable a sensor fusion module 108 in ego vehicle 100 to enhance its target detection and identification capabilities.

In various examples, lidars 104, 112 and 116 can all be used to complement the information acquired by radar 106 and camera 102 and improve the performance of an autonomous driving system in ego vehicle 100. The autonomous driving system may rely on the use of an iMTM radar (e.g., radar 106) with machine and deep learning capabilities. The system benefits from the sensor fusion of multiple perception sensors for training its machine and deep learning networks and improving their training and perceptual inference performance.

Vehicle identification is also enhanced by increasing the resolution of the radar data acquired by radar 106. The radar data is up-sampled with a super-resolution deep learning network that is trained to map radar data onto lidar data. The training data provided to the super-resolution network includes radar data acquired by radar 106 and time-synchronized lidar data acquired by lidar 104 or by other lidars in autonomous vehicles in the vicinity of ego vehicle 100, such as lidar 112 in autonomous vehicle 110 and lidar 116 in autonomous vehicle 114. The time synchronization is provided by recording timestamps together with the acquired radar data and lidar data and associating the radar data with the lidar data which is nearest to it in time. As the lidar data is of a higher resolution than the radar data, the super-resolution network effectively increases the resolution of the acquired radar data prior to it being used to detect and identify targets in the path and surrounding environment of the ego vehicle 100.

Figure 2:
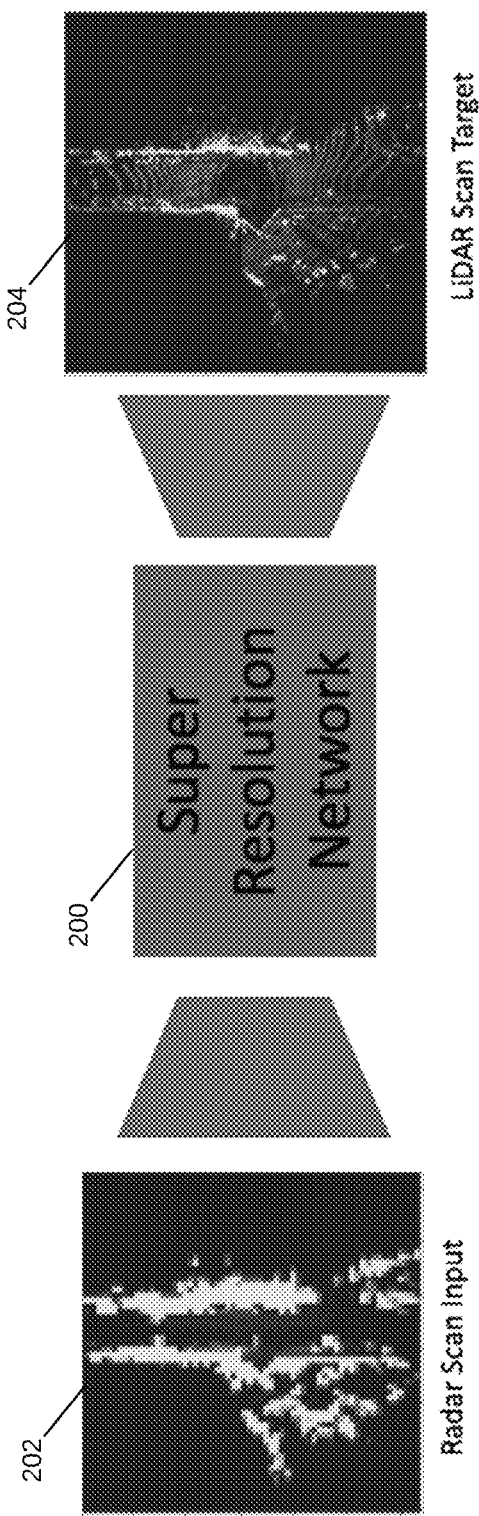
FIG. 2 illustrates a schematic diagram of a super-resolution network for use in a super-resolution radar system in accordance with various examples.

A schematic diagram of a super-resolution network 200 for use in super-resolution radar in accordance with various examples is illustrated in FIG. 2. The super-resolution network 200 receives radar data 202 (depicted as "Radar Scan Input") and learns to map the received radar data into a representative radar dataset that substantially corresponds to the lidar data 204 (depicted as "LiDAR Scan Target"). In some implementations, the radar data 202 may have a lower resolution than lidar data 204. By using lidar data 204 as a "ground truth" representation of a scene, super-resolution network 200 can learn how to map a lower-resolution radar dataset into a higher-resolution radar dataset so that the higher-resolution dataset contains features of the scene with greater granularity than that of the lower-resolution radar dataset and facilitates the identification of targets. The learning of the super-resolution network 200 is achieved with time-synchronized radar and lidar data to ensure that the two represent the scene and targets in the scene at the same time.

Figure 3:
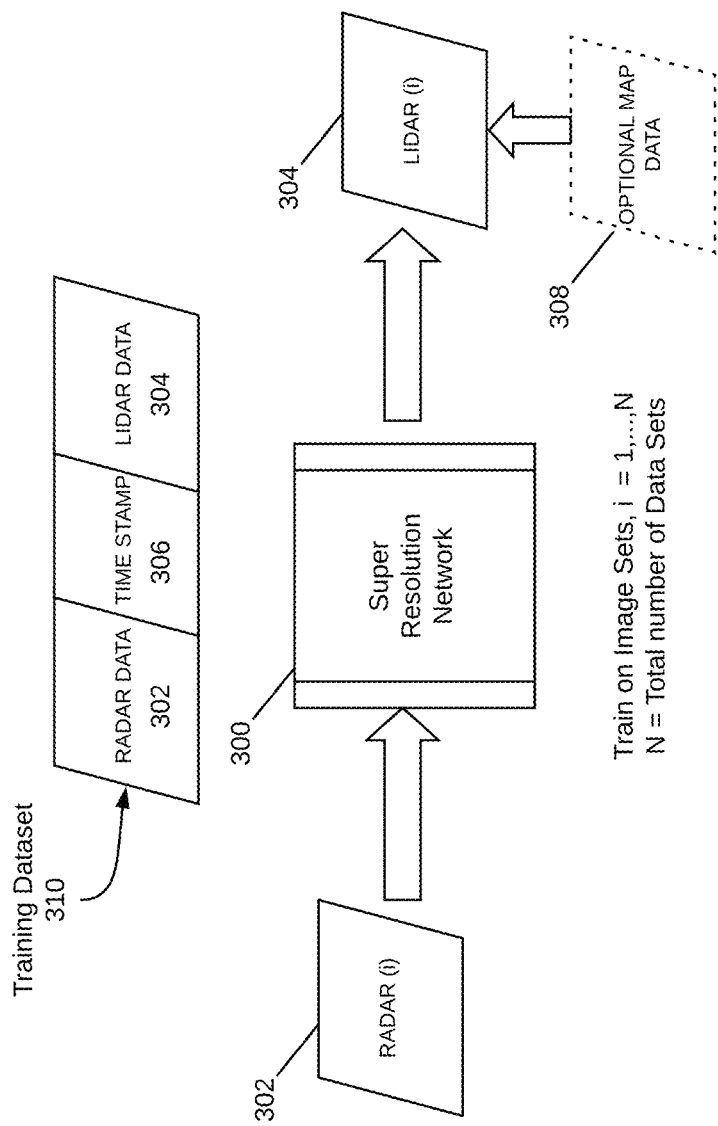
FIG. 3 illustrates the training dataset for the super-resolution network of FIG. 2.

FIG. 3 illustrates a training dataset 310 for training a super-resolution network 300. The super-resolution network 300, which is, or includes at least a portion of, the super-resolution network 200 of FIG. 2, trains on the training dataset 310. In some implementations, the training dataset 310 includes one or more image sets of radar data 302 and lidar data 304, including associated timestamp data 306. The radar data 302 and the lidar data 304 are time-synchronized in accordance with the associated timestamp data 306. In some implementations, each radar dataset (i) 302 and lidar dataset (i) 304, with i=1, 2, . . . , N, where N=the total number of training datasets, are acquired by their respective perception sensors with associated timestamps. The super-resolution network 300 is trained to map the radar dataset 302 having first timestamp data 306 into a radar data representation that substantially corresponds to the lidar dataset 304 having second timestamp data 306 that is nearest to the first timestamp data 306 in time. In a training operation, the super-resolution network 300 receives input radar data of an $i^{th}$ radar dataset 302 and produces a radar data output that substantially corresponds to the "ground truth" lidar data of an $i^{th}$ lidar dataset 304. In one or more implementations, optional map data 308 can be used to enhance the lidar dataset 304.

Figure 4:
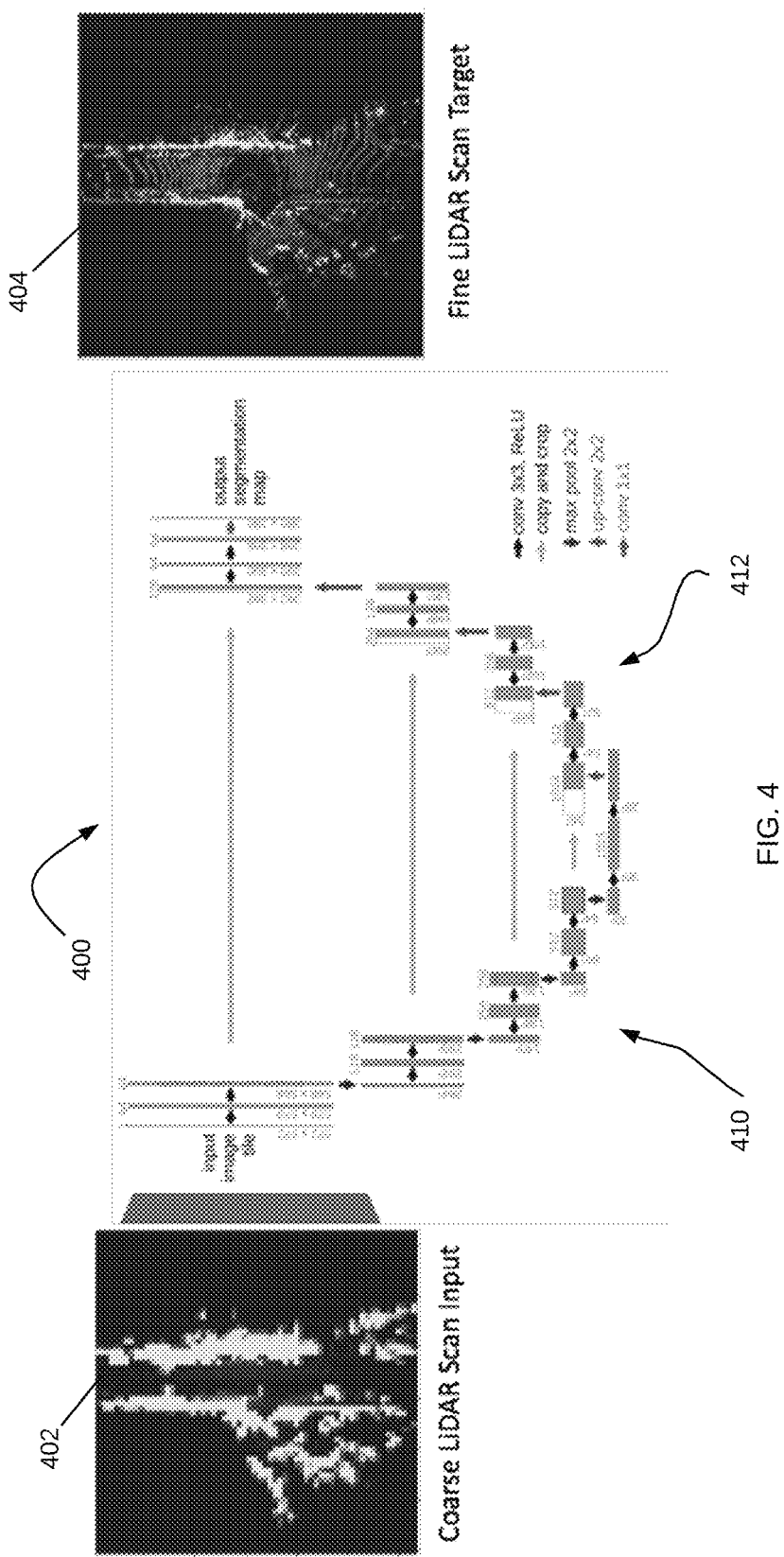
FIG. 4 illustrates a schematic diagram of an example implementation of the super-resolution network of FIG. 3.

FIG. 4 illustrates a schematic diagram of an example implementation of the super-resolution network of FIG. 3. Super-resolution network 400 is based on a U-net fully convolutional neural network architecture having up-sampling operators in each layer to increase the resolution of the output. The neural network has a contracting path 410 (e.g., left side) that receives an input image tile and an expansive path 412 (e.g., right side) that provides an output segmentation map. The contracting path 410 includes a repeated application of at least two 3×3 convolutions, each followed by a rectified linear unit and a 2×2 max pooling operation with stride 2 for down-sampling. At each down-sampling step, the number of feature channels is doubled. Every step in the expansive path consists of an up-sampling of the feature map followed by a 2×2 convolution that halves the number of feature channels, a concatenation with the correspondingly cropped feature map from the contracting path 410, and two 3×3 convolutions, each followed by a rectified linear unit. At the final layer, a 1×1 convolution is used to map each feature vector to the desired number of classes. In one or more implementations, the super-resolution network 400 has 23 layers; however, the number of layers may vary depending on implementation.

In some aspects, high resolution features from the contracting path 410 are combined with the up-sampled output at each layer so that each successive convolution layer can learn to assemble a more precise output. Also, in various examples, the input image tile is provided to the final convolutional layer to allow it to simply pass through values which do not need to change. There is also no need to define a partial convolutional layer in the architecture of the super-resolution network 400 as the 'mask' is evenly spaced and unchanging from training to inference. As depicted in FIG. 4, the input image tile includes a coarse lidar scan input 402 that is fed through the super-resolution network 400, which provides the output segmentation map indicating an image representation of a fine lidar scan target 404.

Figure 5:
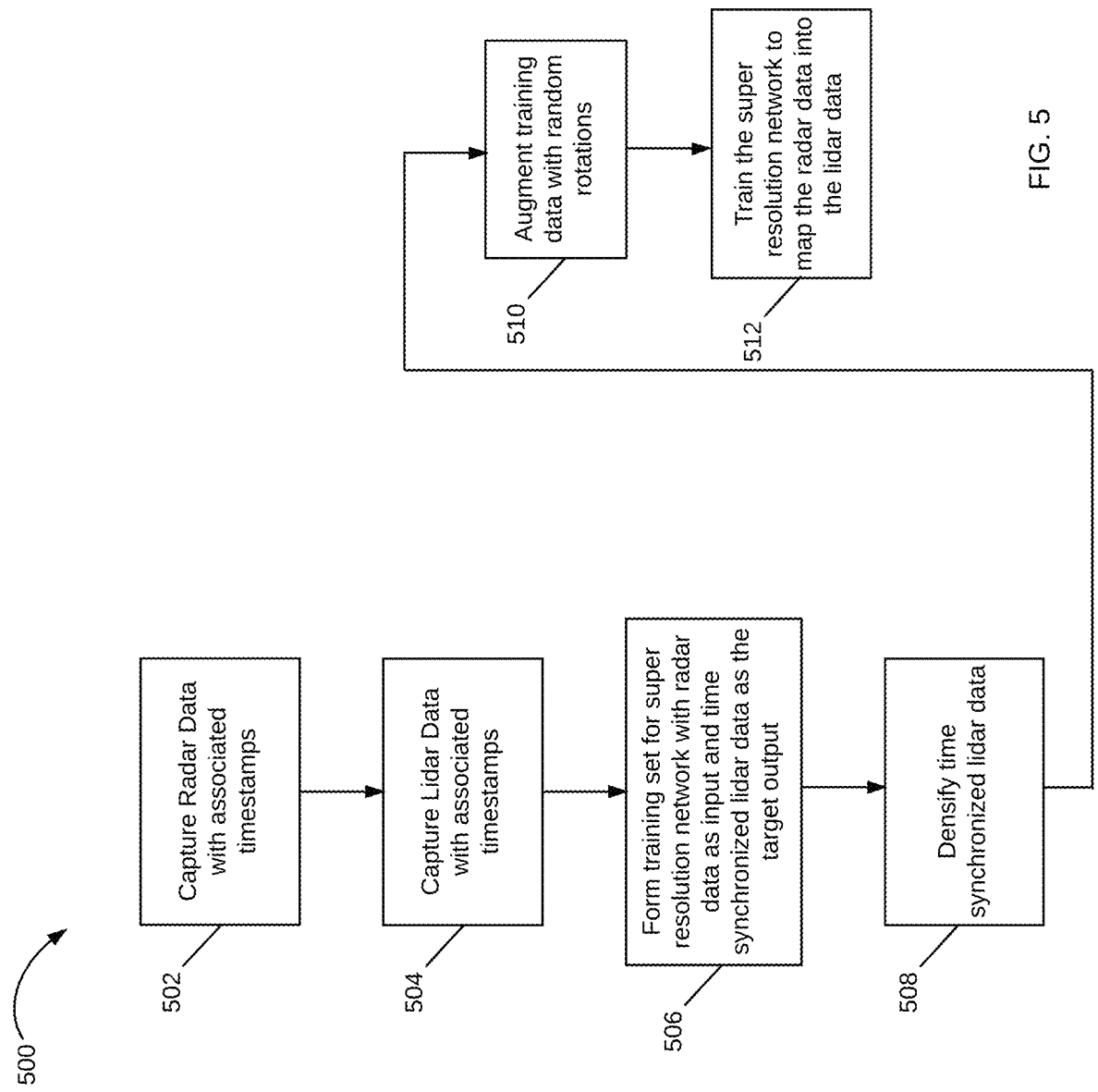
FIG. 5 illustrates a flowchart of an example process for training a super-resolution network, in accordance with various examples.

Attention is now directed to FIG. 5, which illustrates a flowchart of an example process 500 for training a super-resolution network, in accordance with various examples. For explanatory purposes, the example process 500 is primarily described herein with reference to the super-resolution network 400 of FIG. 4; however, the example process 500 is not limited to the super-resolution network 400 of FIG. 4, and the example process 500 can be performed by one or more other components of the super-resolution network 400 of FIG. 4. Further for explanatory purposes, the blocks of the example process 500 are described herein as occurring in series, or linearly. However, multiple blocks of the example process 500 can occur in parallel. In addition, the blocks of the example process 500 can be performed in a different order than the order shown and/or one or more of the blocks of the example process 500 are not performed.

The example process 500 begins at step 502, where radar data is captured with associated timestamps by one or more radar sensors. Next, at step 504, lidar data is captured with associated timestamps by one or more lidar sensors. In some implementations, the captured radar data includes coarse-resolution radar data. Subsequently, at step 506, a training set is formed with lidar data that is time-synchronized with the coarse-resolution radar dataset. In this respect, the coarse-resolution radar dataset serves as input to the super-resolution network and the lidar dataset serves as the expected output of the super-resolution network. In some examples, the lidar data and the radar data in the training set have associated timestamps that are nearest in time, or preferably, at a substantially equivalent time. In other implementations, the training set may be formed with coarse-resolution lidar data if the radar data is not available.

Next, at step 508, the lidar data in the training set is densified given that radar data is dense and lidar data is in the form of sparse point clouds. This sub-process may include mapping each lidar dataset onto a "Bird's Eye 2.5D" representation by subdividing the FoV into regularly spaced voxels of infinite height. In one example, the value of each voxel is defined to be the difference in height between the highest and lowest points within its bounds. Other examples may implement this voxel representation differently, such as by having voxel occupancy at various heights, RGB-D (Red-Green-Blue-Depth) representations, or other means of mapping sparse lidar point clouds into denser representations. Subsequently, at step 510, random rotations in the dataset are introduced as a form of data augmentation to avoid overfitting issues in the neural network performance. Next, at step 512, the super-resolution network is then trained with the training set to map the radar data into the lidar data. For example, the super-resolution network can learn to map features of a coarse-resolution radar image into an output image having features that substantially correspond to features of a target fine-resolution lidar image. The neural network performance can improve even further with a larger training dataset.

Figure 6:
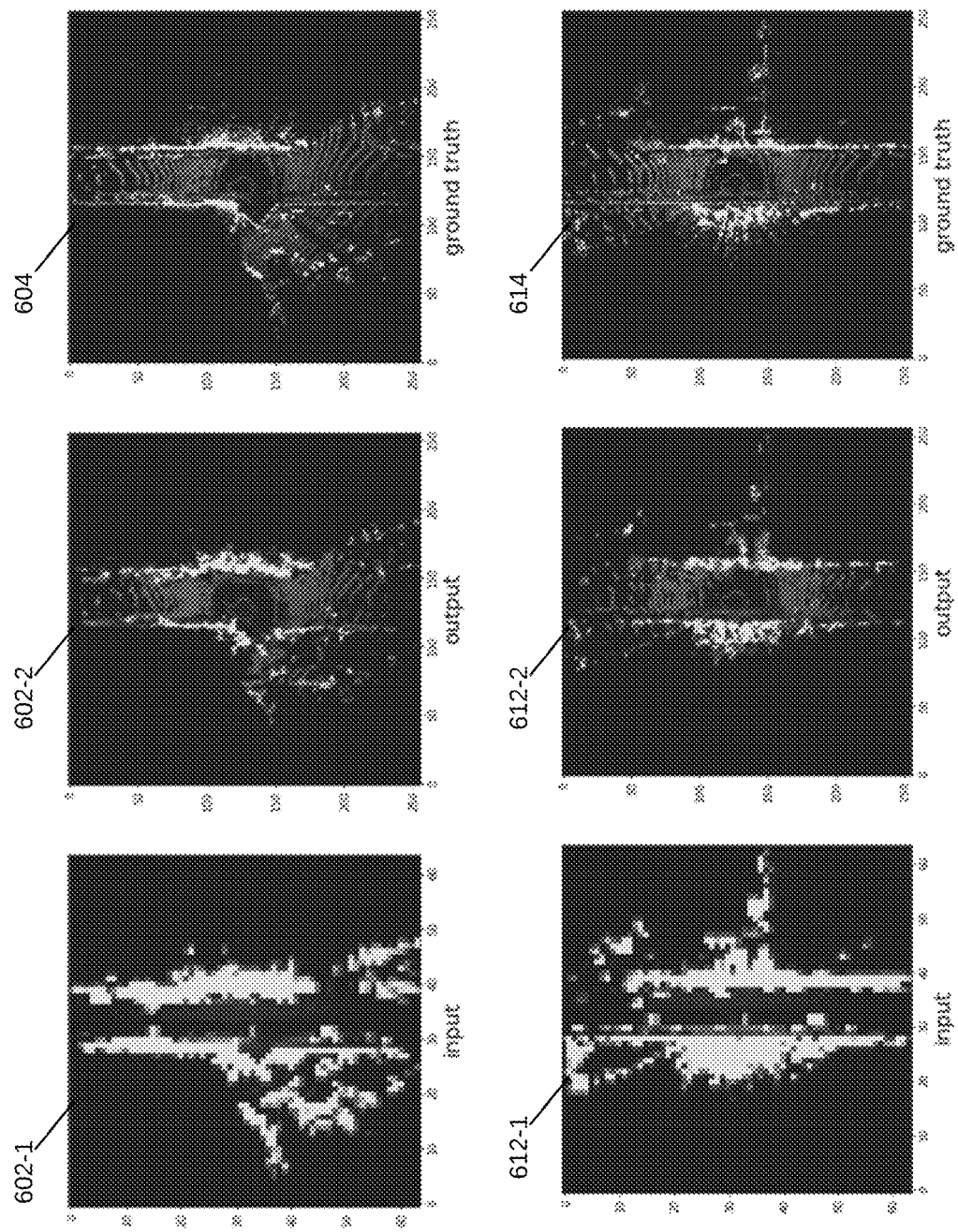
FIG. 6 illustrates different plot diagrams depicting results of training a super-resolution network in accordance with various examples.

FIG. 6 illustrates different plot diagrams depicting results of training a super-resolution network in accordance with various examples. For example, the plot diagrams show the results of training the super-resolution network 400 of FIG. 4 with the steps of FIG. 5 based at least on a sample lidar dataset. In some implementations, the sample lidar dataset includes a raw dataset having raw input frames where images may be distorted, and frame indices may not correspond. FIG. 6 includes a plot diagram 602-1 that depicts an image representation from a first input dataset, a plot diagram 602-2 that depicts an image representation from a first output of the super-resolution network and a plot 604 that depicts an image representation from a first target lidar dataset. FIG. 6 also includes a plot diagram 612-1 that depicts an image representation from a second input dataset, a plot diagram 612-2 that depicts an image representation from a second output of the super-resolution network and a plot 614 that depicts an image representation from a second target lidar dataset. In some implementations, the input data set for the training process in this example include coarse-resolution lidar data images from a hold-out test set that is transformed into a Bird's Eye representation. In other implementations, the input data set includes coarse-resolution radar data images. As shown in the plot diagrams 602-2 and 612-2, the output of the super-resolution network is a very close representation of the ground truth higher resolution lidar data (e.g., 604, 614). The most impressive results were obtained using low resolution lidar images, which include $\frac{1}{16}^{th}$ the total number of pixels as the high-resolution images.

In some implementations, the super-resolution network may utilize one sensor modality to improve the performance of another sensor modality, algorithmically. In this respect, the super-resolution network can be considered a semi-supervised network, because it is trained on time-synchronized lidar and radar data without needing to know any information regarding the content of the data. Further, the super-resolution network can be utilized to form the initial layers of a deep learning convolutional neural network that performs target classification. The training of the initial network layers are in effect offloaded to a task for which there is significantly more data. It is also noted that because the architecture of a super-resolution network (e.g., the super-resolution network 400 of FIG. 4) is particularly well suited to change the resolution of data passed through it, it is easier to accommodate the undoubtedly changing resolutions from radar hardware. Such a super-resolution network excels at receiving information from radar scans with different pulse sequences, and converting this information into a canonical form for the deep learning convolutional neural network to identify targets of interest.

Figure 7:
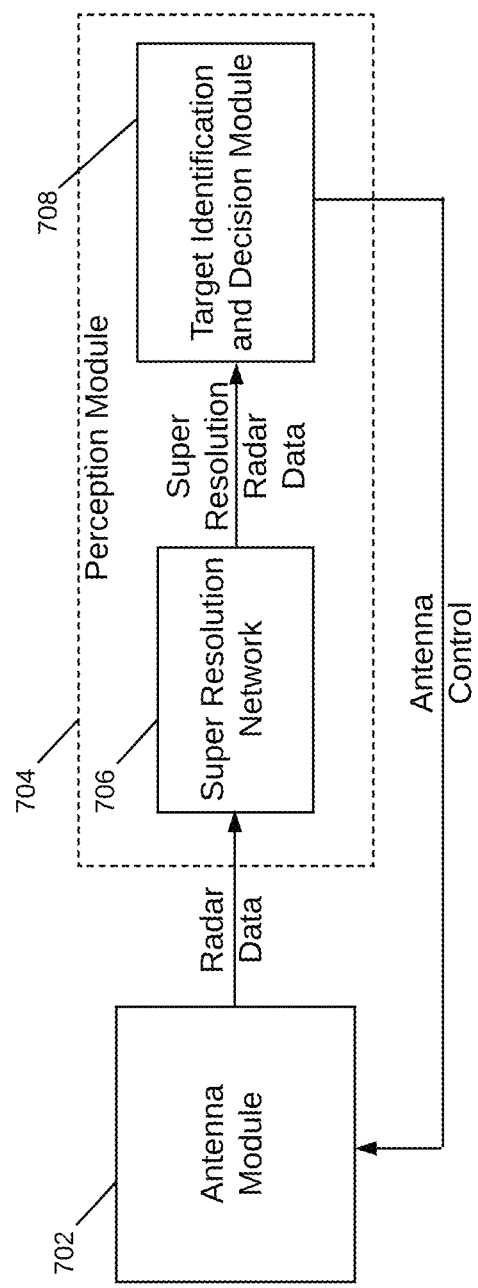
FIG. 7 is a schematic diagram of a super-resolution radar system in accordance with various examples.

After training, the super-resolution network can be used as a preliminary step in target detection and identification. FIG. 7 illustrates a schematic diagram of an example super-resolution radar system 700 in accordance with various examples. The super-resolution radar system 700 includes an antenna module 702 and a perception module 704. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The super-resolution radar system 700 is a "digital eye" with true 3D vision and capable of a human-like interpretation of the world. The "digital eye" and human-like interpretation capabilities are provided by two main modules: the antenna module 702 and the perception module 704. The antenna module 702, described in more detail below with reference to FIG. 8, includes a dynamically controllable iMTM antenna for providing dynamically controllable and steerable beams that can focus on one or multiple portions of a 360° FoV of the ego vehicle.

Antenna control is provided in part by the perception module 704. Radar data generated by the antenna module 702 is provided to the perception module 704 for target detection and identification. The radar data is first sent to the super-resolution network 706, which is, or includes at least a portion of, the super-resolution network 200, 300 and/or 400, to increase the resolution of the input radar set to generate a higher resolution radar dataset. In some aspects, the high resolution radar dataset may include features of the input radar set along with features that substantially correspond to a target lidar dataset. The higher resolution radar data is then sent to a target identification and decision module 708, which implements a convolutional neural network for target detection and identification and a decision neural network for deciding which actions the antenna module 702 should perform next. For example, the target identification and decision module 708 may detect a cyclist on the path of the ego vehicle and may direct the antenna module 702 to focus additional RF beams at a given phase shift and direction within the portion of the FoV corresponding to the cyclist's location.

Figure 8:
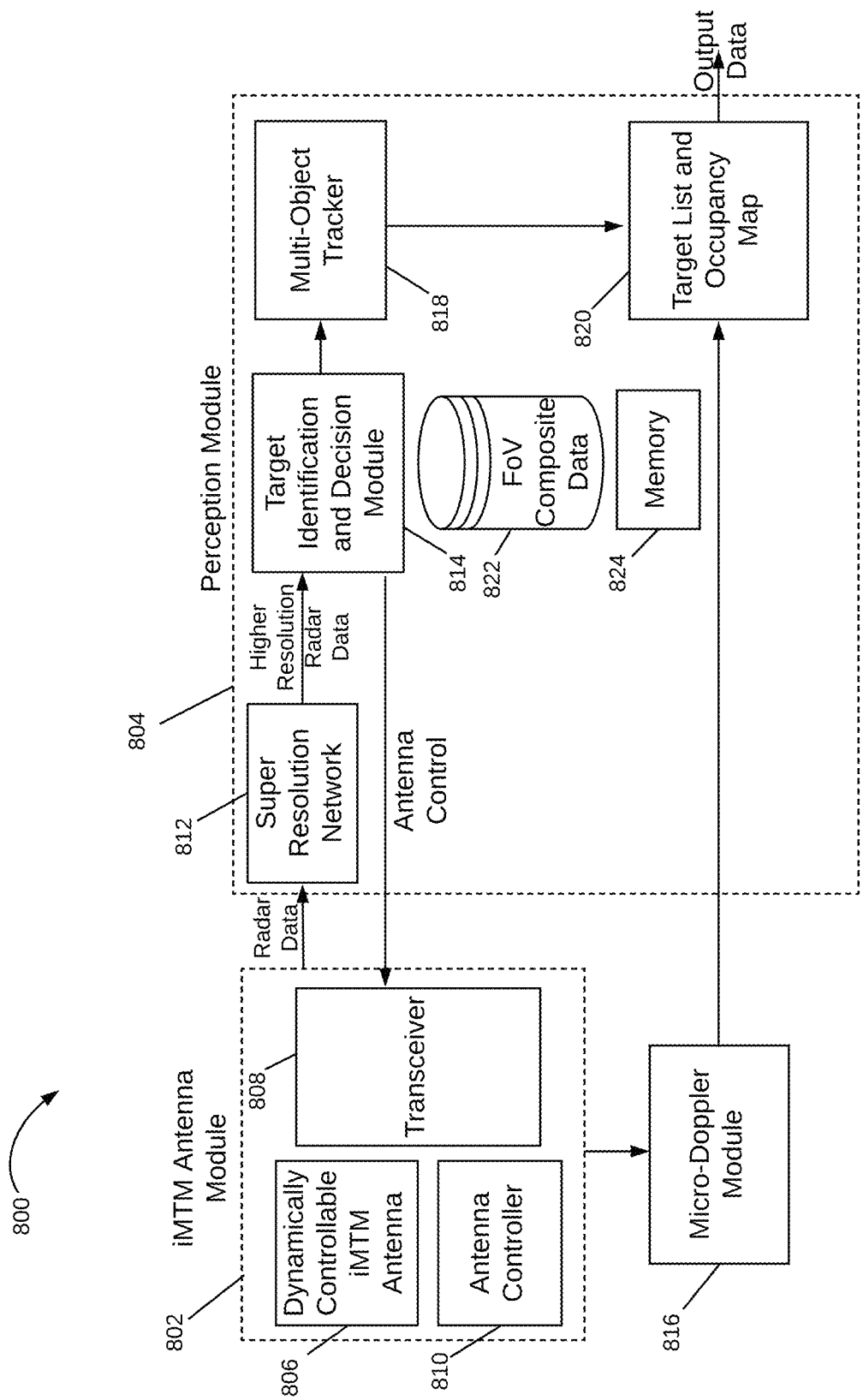
FIG. 8 illustrates a schematic diagram of the super-resolution radar system of FIG. 7 with additional detail in accordance with various examples.

FIG. 8 illustrates a schematic diagram of a super-resolution radar system 800 in accordance with various examples. The super-resolution radar system 800 is, or includes at least a portion of, the super-resolution radar system 700 of FIG. 7, with additional detail. The super-resolution radar system 800 includes iMTM Antenna Module 802 and perception Module 804. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The iMTM antenna module 802 includes a Dynamically Controllable iMTM (DCiMTM) antenna 806, a transceiver module 808 and an antenna controller 810. The DCiMTM antenna 806 can radiate dynamically controllable and highly-directive RF beams using meta-structures. A meta-structure, as generally defined herein, is an engineered, non- or semi-periodic structure that is spatially distributed to meet a specific phase and frequency distribution. In some implementations, the meta-structures include metamaterials. The transceiver module 808 is coupled to the DCiMTM antenna 806, and prepares a signal for transmission, such as a signal for a radar device. In some aspects, the signal is defined by modulation and frequency. The signal is provided to the DCiMTM antenna 806 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 810, such as at the direction of perception module 804.

The RF beams reflect from targets in the ego vehicle's path and surrounding environment, and the RF reflections are received by the transceiver module 808. Radar data from the received RF beams is provided to the perception module 804 for target detection and identification. A super-resolution network 812 increases the resolution of the radar data prior to it being processed to detect and identify targets. For example, the super-resolution network 812 can process the radar data and determine high resolution radar data for use by the perception module 804. In various examples, the super-resolution network 812 can be a part of the perception module 804, such as on the same circuit board as the other modules within the perception module 804. Also, in various examples, the data encoding may use the lidar point cloud from the ego lidar to perform NLOS correction in the radar data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception module 804 controls further operation of the iMTM antenna module 802 by, for example, providing an antenna control signal containing beam parameters for the next RF beams to be radiated from the iMTM cells in the DCiMTM antenna 806.

In operation, the antenna controller 810 is responsible for directing the DCiMTM antenna 806 to generate RF beams with determined parameters such as beam width, transmit angle, and so on. The antenna controller 810 may, for example, determine the parameters at the direction of perception module 804, which may at any given time determine to focus on a specific area of an FoV upon identifying targets of interest in the ego vehicle's path or surrounding environment. The antenna controller 810 determines the direction, power, and other parameters of the RF beams and controls the DCiMTM antenna 806 to achieve beam steering in various directions. The antenna controller 810 also determines a voltage matrix to apply to reactance control mechanisms coupled to the DCiMTM antenna 806 to achieve a given phase shift. In some examples, the DCiMTM antenna 806 is adapted to transmit a directional beam through active control of the reactance parameters of the individual iMTM cells that make up the DCiMTM antenna 806. The perception module 804 provides control actions to the antenna controller 810 at the direction of the Target Identification and Decision Module 814.

Next, the DCiMTM antenna 806 radiates RF beams having the determined parameters. The RF beams are reflected off of targets in and around the ego vehicle's path (e.g., in a 360° field of view) and are received by the transceiver module 808 in iMTM antenna module 802. The iMTM antenna module 802 transmits the received 4D radar data to the super-resolution network 812 for increasing the resolution of the radar data, for which higher resolution radar data is then sent to the target identification and decision module 814 of the perception module 804. The use of the super-resolution network 812 also improves the training and performance of the target identification and decision module 814. A micro-doppler module 816 coupled to the iMTM antenna module 802 and the perception module 804 extracts micro-doppler signals from the 4D radar data to aid in the identification of targets by the perception module 804. The micro-doppler module 816 takes a series of RD maps from the iMTM antenna module 802 and extracts a micro-doppler signal from them. The micro-doppler signal enables a more accurate identification of targets as it provides information on the occupancy of a target in various directions. Non-rigid targets such as pedestrians and cyclists are known to exhibit a time-varying doppler signature due to swinging arms, legs, etc. By analyzing the frequency of the returned radar signal over time, the perception module 804 can determine the class of the target (i.e., whether a vehicle, pedestrian, cyclist, animal, etc.) with over 90% accuracy. Further, as this classification may be performed by a linear Support Vector Machine (SVM), it is extremely computationally efficient. In various examples, the micro-doppler module 816 can be a part of the iMTM antenna module 802 or the perception module 804, such as on the same circuit board as the other modules within the iMTM antenna module 802 or perception module 804.

The target identification and decision module 814 receives the higher resolution radar data from the super-resolution network 812, processes the data to detect and identify targets, and determines the control actions to be performed by the iMTM antenna module 802 based on the detection and identification of such targets. For example, the target identification and decision module 814 may detect a cyclist on the path of the ego vehicle and direct the iMTM antenna module 802, at the instruction of its antenna controller 810, to focus additional RF beams at a given phase shift and direction within the portion of the FoV corresponding to the cyclist's location.

The perception module 804 may also include a multi-object tracker 818 to track the identified targets over time, such as, for example, with the use of a Kalman filter. The multi-object tracker 818 matches candidate targets identified by the target identification and decision module 814 with targets it has detected in previous time windows. By combining information from previous measurements, expected measurement uncertainties, and some physical knowledge, the multi-object tracker 818 generates robust, accurate estimates of target locations.

Information on identified targets over time are then stored at a target list and occupancy map 820, which keeps track of targets' locations and their movement over time as determined by the multi-object tracker 818. The tracking information provided by the multi-object tracker 818 and the micro-doppler signal provided by the micro-doppler module 816 are combined at the target list and occupancy map 820 to produce an output containing the type/class of target identified, their location, their velocity, and so on. This information from iMTM radar system 800 is then sent to a sensor fusion module (not shown), where it is processed together with information from other sensors in the ego vehicle.

In various examples, the perception module 804 includes an FoV composite data unit 822, which stores information that describes an FoV. This information may be historical data used to track trends and anticipate behaviors and traffic conditions or may be instantaneous or real-time data that describes the FoV at a moment in time or over a window in time. The ability to store this data enables the perception module 804 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception module 804 may determine to narrow the beam width for a more focused view of that sector or area in the FoV. The next scan may indicate the targets' length or other dimension, and if the target is a vehicle, the perception module 804 may consider what direction the target is moving and focus the beams on that area. Similarly, the echo may be from a spurious target, such as a bird, which is small and moving quickly out of the path of the vehicle. There are a variety of other uses for the FoV composite data 822, including the ability to identify a specific type of target based on previous detection. The perception module 804 also includes a memory 824 that stores useful data for iMTM radar system 800, such as, for example, information on which subarrays of the DCiMTM antenna 806 perform better under different conditions.

In various examples described herein, the use of iMTM radar system 800 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 115 km/h, a driver may need to slow down to 80 km/h when visibility is poor. Using the iMTM radar system 800, the driver (or driverless vehicle) may maintain the maximum safe speed without regard to the weather conditions. Even if other drivers slow down, a vehicle enabled with the iMTM radar system 800 can detect those slow-moving vehicles and obstacles in its path and avoid/navigate around them.

Additionally, in highly congested areas, it is necessary for an autonomous vehicle to detect targets in sufficient time to react and take action. The examples provided herein for an iMTM radar system increase the sweep time of a radar signal so as to detect any echoes in time to react. In rural areas and other areas with few obstacles during travel, the perception module 804 adjusts the focus of the RF beam to a larger beam width, thereby enabling a faster scan of areas where there are few echoes. The perception module 804 may detect this situation by evaluating the number of echoes received within a given time period and making beam size adjustments accordingly. Once a target is detected, the perception module 804 determines how to adjust the beam focus. This is achieved by changing the specific configurations and conditions of the DCiMTM antenna 806. In one example scenario, the voltages on the reactance control mechanisms of the reactance control module of DCiMTM antenna 806 are adjusted. In another example scenario, a subset of iMTM unit cells is configured as a subarray. This configuration means that this set may be treated as a single unit, and all the cells within the subarray are adjusted similarly. In another scenario, the subarray is changed to include a different number of unit cells, where the combination of iMTM unit cells in a subarray may be changed dynamically to adjust to conditions and operation of the iMTM radar system 800.

All of these detection scenarios, analysis and reactions may be stored in the perception module 804, such as in the memory 824, and used for later analysis or simplified reactions. For example, if there is an increase in the echoes received at a given time of day or on a specific highway, that information is fed into the antenna controller 810 to assist in proactive preparation and configuration of the DCiMTM antenna 806. Additionally, there may be some subarray combinations that perform better, such as to achieve a desired result, and this is stored in the memory 824.

Figure 9:
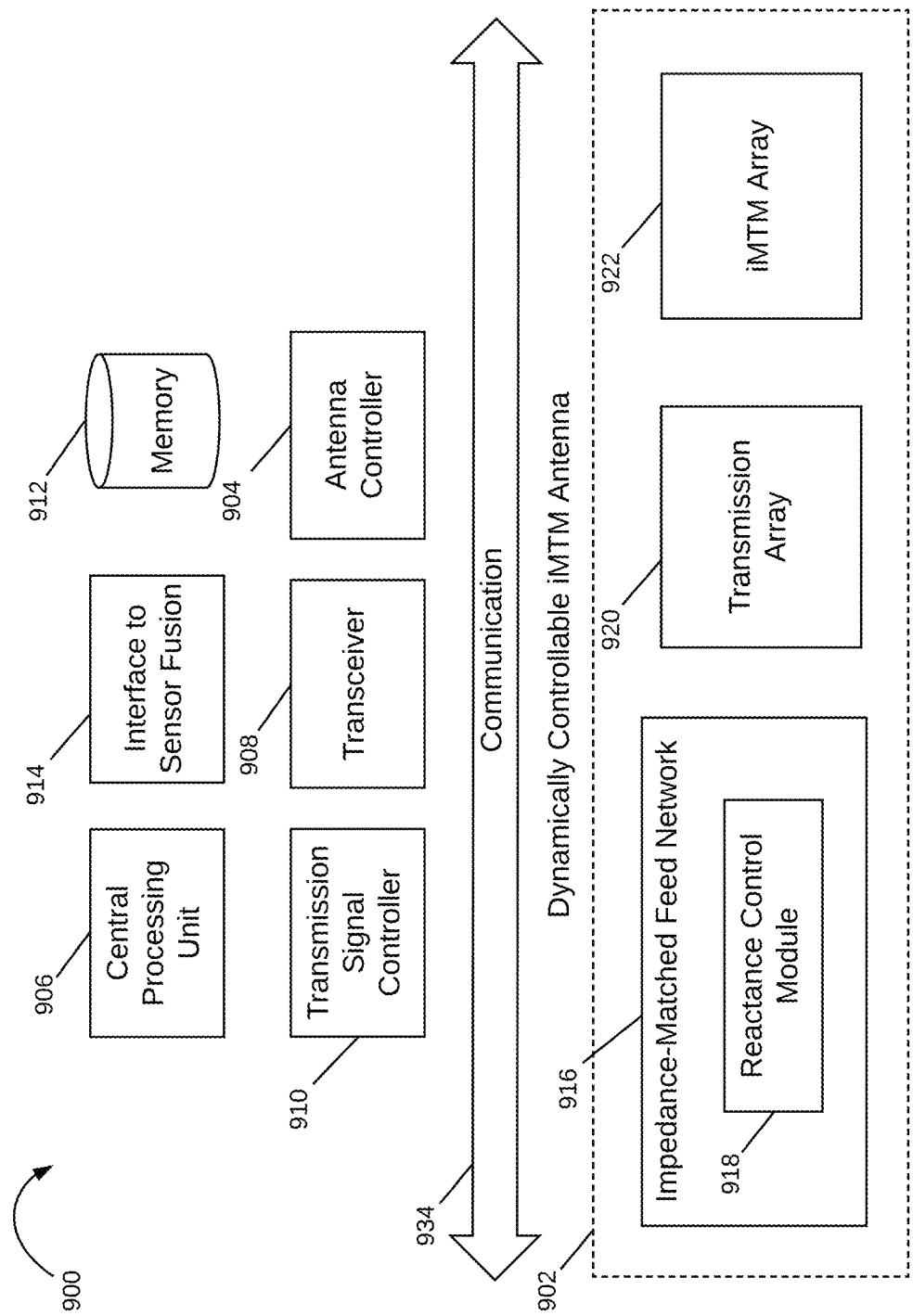
FIG. 9 illustrates a schematic diagram of an Intelligent Metamaterial (iMTM) antenna module for use with the super-resolution radar of FIG. 8 in accordance with various examples.

Attention is now directed to FIG. 9, which shows a schematic diagram of an iMTM antenna module 900 for use with the super-resolution radar network in the iMTM radar system 800 of FIG. 8 in accordance with various examples. The iMTM antenna module 900 has an DCiMTM antenna 902 coupled to an antenna controller 904, a central processor 906, and a transceiver 908. A transmission signal controller 910 generates the specific transmission signal, such as an FMCW signal, which is used for radar sensor applications as the transmitted signal is modulated in frequency, or phase. The FMCW signal enables a radar to measure range to a target by measuring the phase differences in phase or frequency between the transmitted signal and the received or reflected signal. Within FMCW formats, there are a variety of modulation patterns that may be used within FMCW, including sinusoidal, triangular, sawtooth, rectangular and so forth, each having advantages and purposes. For example, sawtooth modulation may be used for large distances to a target; a triangular modulation enables use of the Doppler frequency, and so forth.

Other modulation types may be incorporated according to the desired information and specifications of a system and application. For example, the transmission signal controller 910 may also generate a cellular modulated signal, such as an Orthogonal Frequency Division Multiplexed (OFDM) signal. In some examples, the signal is provided to the iMTM antenna module 900 and the transmission signal controller 910 may act as an interface, translator or modulation controller, or otherwise as required for the signal to propagate through a transmission line system. The received information is stored in a memory storage unit 912, wherein the information structure may be determined by the type or transmission and modulation pattern.

The DCiMTM antenna 902 includes a transmission array 920 and an iMTM array 922. In operation, the DCiMTM antenna 902 radiates the signal to a radiating array of iMTM cells in the iMTM array 922. In various examples, the DCiMTM antenna 902 includes an impedance-matched feed network 916, having a reactance control module 918. The reactance control module 918 includes a reactance control mechanism controlled by antenna controller 904, which may be used to control the phase of a radiating signal from radiating array structures, such as iMTM array 922.

Note that as illustrated in FIG. 9, there is one DCiMTM antenna 902 in iMTM antenna module 900. However, an iMTM antenna module 900 may have multiple DCiMTM antennas in any given configuration. A set of DCiMTM antennas may be designated as transmit antennas, and another set may be designated as receive antennas. Further, a DCiMTM antenna may be orthogonal from another. Different DCiMTM antennas may also have different polarizations. In various examples, different DCiMTM antennas may be configured to detect different targets, e.g., a set of antennas may be configured to enhance the detection and identification of pedestrians, another set of antennas may be configured to enhance the detection and identification of vehicles, and so forth. In the case of pedestrians, the configuration of the antennas may include power amplifiers to adjust the power of a transmitted signal and/or different polarization modes for different arrays to enhance pedestrian detection. It is appreciated that numerous configurations of DCiMTM antennas may be implemented in a given iMTM antenna module.

In operation, the antenna controller 904 receives information from other modules in iMTM antenna module 900 and/or from iMTM perception module 404 in FIG. 4 indicating a next radiation beam. A radiation beam may be specified by parameters such as beam width, transmit angle, transmit direction and so forth. The antenna controller 904 determines a voltage matrix to apply to the reactance control module 918 in DCiMTM antenna 902 to achieve a given phase shift or other parameters. In these examples, the DCiMTM antenna 902 is adapted to transmit a directional beam without using digital beam forming methods, but rather through active control of the reactance parameters of the individual iMTM cells that make up the iMTM array 922.

Transceiver 908 prepares a signal for transmission, such as a signal for a radar device, in which the signal is defined by modulation and frequency. The signal is received by the DCiMTM antenna 902 and the phase of the iMTM cells in the iMTM array 922 is adjusted at the direction of the antenna controller 904. In some examples, transmission signals are received by a portion, or subarray(s), of the iMTM array 922. The iMTM array 922 can be implemented in many applications, including radar, cellular antennas, and autonomous vehicles to detect and identify targets in the path of or surrounding the vehicle. Alternate examples may use the iMTM array 922 for wireless communications, medical equipment, sensing, monitoring, and so forth. Each application type incorporates designs and configurations of the elements, structures and modules described herein to accommodate their needs and goals.

In iMTM antenna module 900, a signal is specified by antenna controller 904, which may be at the direction of an iMTM perception module (e.g., the perception module 804 in FIG. 8), a sensor fusion module via interface-to-sensor fusion 914, or it may be based on program information from memory storage unit 912. There are a variety of considerations to determine the beam formation, in which this information is provided to antenna controller 904 to configure the various elements of the iMTM array 922, which are described herein. The transmission signal controller 910 generates the transmission signal and provides it to the DCiMTM antenna 902, such as through a coaxial cable or other connector. The signal propagates through the impedance-matched feed network 916 to the transmission array 920 and iMTM array 922 for transmission through the air.

The impedance-matched feed network 916 includes impedance matching mechanisms and a reactance control module 918 for respectively matching input signal parameters with the iMTM cells in iMTM array 922 and providing phase shift control to each cell. The impedance matching mechanisms may include a directional coupler having an input port to each of adjacent transmission lines in the impedance-matched feed network 916. The adjacent transmission lines in impedance-matched feed network 916 may form a super element, in which an adjacent transmission line pair has a specific phase difference, such as a 90° phase difference with respect to each other.

The impedance matching mechanisms work in coordination with the reactance control module 918 to provide phase shifting of the radiating signal(s) from the iMTM array 922. In various examples, the reactance control module 918 includes a reactance control mechanism controlled by antenna controller 904, which may be used to control the phase of a radiating signal from the iMTM cells in the iMTM array 922 and to adjust the effective reactance of a transmission line and/or a cell fed by a transmission line in the impedance-matched feed network 916. The reactance control module 918 may, for example, include a varactor, a varactor network, a phase shift network, or any other mechanism capable of providing a desired phase shift up to 360° in each iMTM cell. The phase shift network system may include multiple varactors to achieve the desired phase shift.

One or more reactance control mechanisms may be placed within a transmission line in the impedance-matched feed network 916. Similarly, reactance control mechanisms may be placed within multiple transmission lines or within each iMTM radiating cell to achieve a desired result. The reactance control mechanisms may have individual controls or may have a common control. In some examples, a modification to a first reactance control mechanism is a function of a modification to a second reactance control mechanism. Further, the reactance control module 918 may be positioned within the architecture of impedance-matched feed network 916; one or both may be external to the impedance-matched feed network 916 for manufacture or composition as an antenna or radar module.

Figure 10:
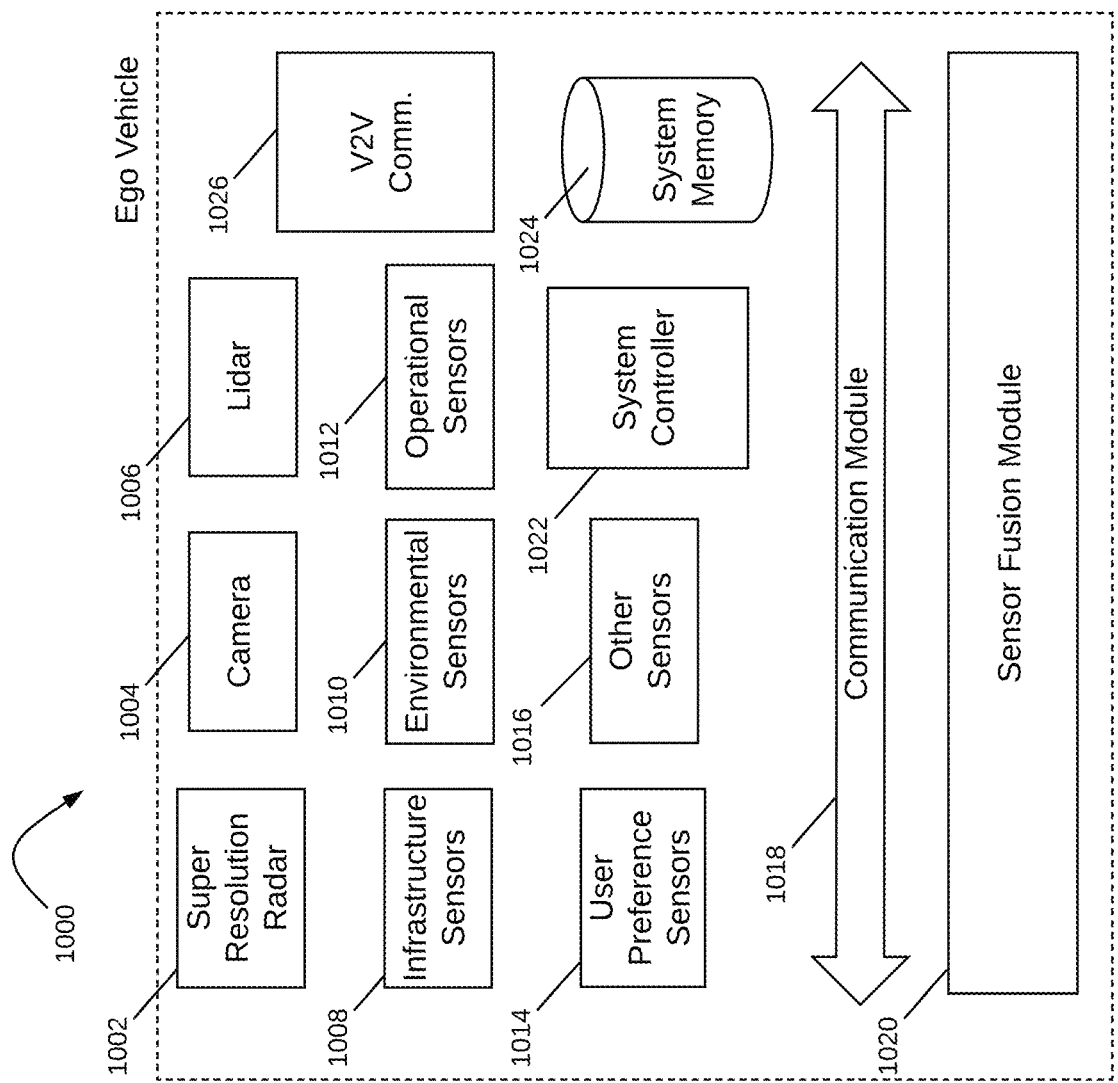
FIG. 10 illustrates a schematic diagram of an autonomous driving system for an ego vehicle in accordance with various examples.

Attention is now directed to FIG. 10, which illustrates a schematic diagram of an autonomous driving system 1000 for an ego vehicle in accordance with various examples. Autonomous driving system 1000 is a system for use in an ego vehicle that provides partial or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 1000 includes an super-resolution radar 1002 and other sensor systems such as camera 1004, lidar 1006, infrastructure sensors 1008, environmental sensors 1010, operational sensors 1012, user preference sensors 1014, and other sensors 1016. Autonomous driving system 1000 also includes a communications module 1018, a sensor fusion module 1020, a system controller 1022, a system memory 1024, and a V2V communications module 1026. It is appreciated that this configuration of autonomous driving system 1000 is an example configuration and not meant to be limiting to the specific structure illustrated in FIG. 10. Additional systems and modules not shown in FIG. 10 may be included in autonomous driving system 1000.

Super-resolution radar 1002 includes an iMTM antenna module as shown in FIG. 8 for providing dynamically controllable and steerable beams that can focus on one or multiple portions of a 360° FoV of the vehicle. The beams radiated from the iMTM antenna module are reflected from targets in the vehicle's path and surrounding environment and received and processed by the super-resolution radar 1002 to detect and identify the targets. The super-resolution radar 1002 also has an iMTM perception module as shown in FIG. 8 that is trained to detect and identify targets and control the iMTM antenna module as desired. Camera sensor 1004 and ego lidar 1006 are also used to detect targets in the path and surrounding environment of the ego vehicle, albeit in a much lower range.

Infrastructure sensors 1008 may provide information from infrastructure while driving, such as from a smart road configuration, billboard information, traffic alerts and indicators, including traffic lights, stop signs, traffic warnings, and so forth. This is a growing area, and the uses and capabilities derived from this information are immense. Environmental sensors 1010 detect various conditions outside, such as temperature, humidity, fog, visibility, precipitation, and so forth. Operational sensors 1012 provide information about the functional operation of the vehicle. This may be battery charge level, tire pressure, fuel levels, brake wear, and so forth. The user preference sensors 1014 may be configured to detect conditions that are part of a user preference. This may be temperature adjustments, smart window shading, and so forth. Other sensors 1016 may include additional sensors for monitoring conditions in and around the vehicle.

In various examples, the sensor fusion module 1020 optimizes these various functions to provide an approximately comprehensive view of the vehicle and environments. Many types of sensors may be controlled by the sensor fusion module 1020. These sensors may coordinate with each other to share information and consider the impact of one control action on another system. In one example, in a congested driving condition, a noise detection module (not shown) may identify that there are multiple radar signals that may interfere with the vehicle. This information may be used by an iMTM perception module in autonomous driving system 1000 to adjust the beam size of the iMTM antenna module to avoid these other signals and minimize interference.

In another example, environmental sensor 1010 may detect that the weather is changing, and visibility is decreasing. In this situation, the sensor fusion module 1020 may determine to configure the other sensors to improve the ability of the vehicle to navigate in these new weather conditions. The configuration may include turning off one or more sensors, such as camera 1004 and/or lidar 1006 or reducing the sampling rate of these visibility-based sensors. This effectively places reliance on the sensor(s) adapted for the current situation. In response, the iMTM perception module configures the super-resolution radar 1002 for these conditions as well. For example, the super-resolution radar 1002 may reduce the beam width to provide a more focused beam, and thus a finer sensing capability.

In various examples, the sensor fusion module 1020 may send a direct control signal to the iMTM antenna module based on historical conditions and controls. The sensor fusion module 1020 may also use some of the sensors within autonomous driving system 1000 to act as feedback or calibration for the other sensors. In this way, an operational sensor 1012 may provide feedback to the iMTM perception module and/or the sensor fusion module 1020 to create templates, patterns and control scenarios. These are based on successful actions or may be based on poor results, where the sensor fusion module 1020 learns from past actions.

Data from sensors 1002-1016 may be combined in sensor fusion module 1020 to form fused sensor data that improves the target detection and identification performance of autonomous driving system 1000. Sensor fusion module 1020 may itself be controlled by system controller 1022, which may also interact with and control other modules and systems in the vehicle. For example, system controller 1022 may turn on and off the different sensors 1002-1016 as desired, or provide instructions to the vehicle to reduce velocity or stop upon identifying a driving hazard (e.g., deer, pedestrian, cyclist, or another vehicle suddenly appearing in the vehicle's path, flying debris, etc.)

All modules and systems in autonomous driving system 1000 communicate with each other through communication module 1018. Autonomous driving system 1000 also includes system memory 1024, which may store information and data (e.g., static and dynamic data) used for operation of autonomous driving system 1000 and the ego vehicle using autonomous driving system 1000. V2V communication module 1026 is used for communication with other vehicles, including a lead vehicle (e.g., 110) and an AV vehicle (e.g., 114). The V2V communications between the ego vehicle and the lead and AV vehicles include data received from lead vehicle lidar 1028 and AV lidar 1030, respectively. The data received is processed by sensor fusion module 1020 to assist in the training and perceptual inference performance of the iMTM perception module in the ego vehicle. The V2V communications may also include information from other vehicles that is invisible to the user, driver, or rider of the vehicle, and may help vehicles coordinate to avoid an accident.

These various examples support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. Sensor performance is also enhanced with these structures, enabling long-range and short-range visibility. In an automotive application, short-range is considered within 30 meters of a vehicle, such as to detect a person in a cross walk directly in front of the vehicle; and long-range is considered to 250 meters or more, such as to detect approaching cars on a highway. These examples provide automotive radars capable of reconstructing the world around them and are effectively a radar "digital eye," having true 3D vision and capable of human-like interpretation of the world.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. An autonomous driving system in an ego vehicle, comprising:
    a radar system configured to detect a target in a path and a surrounding environment of the ego vehicle and produce radar data with a first resolution that is gathered over a continuous field of view on the detected target;
    a super-resolution network configured to receive the radar data with the first resolution and produce radar data with a second resolution different from the first resolution using one or more first neural networks and a training dataset comprising a radar training dataset and a ground truth densified dataset time-synchronized with the radar training dataset; and
    a target identification module configured to receive the radar data with the second resolution from the super-resolution network and to identify the detected target from the radar data with the second resolution using one or more second neural networks.

2. The autonomous driving system of claim 1, wherein the ground truth densified dataset is a lidar training dataset acquired by a lidar sensor in the ego vehicle and densified to a dense representation.

3. The autonomous driving system of claim 2, wherein the super-resolution network is configured to receive the radar training dataset and to learn to map the received radar training dataset into a representative radar dataset that substantially corresponds to the lidar training dataset.

4. The autonomous driving system of claim 2, wherein the radar training dataset is associated with the lidar training dataset that is nearest to the radar training dataset in time using timestamps associated with the radar training dataset and the lidar training dataset.

5. The autonomous driving system of claim 2, wherein the one or more first neural networks of the super-resolution network are trained to map the radar training dataset into the lidar training dataset.

6. The autonomous driving system of claim 5, wherein the one or more first neural networks of the super-resolution network corresponds to a deep learning network that is configured to up-sample the radar training dataset and is trained to map the up-sampled radar training dataset onto the time-synchronized lidar training dataset.

7. The autonomous driving system of claim 1, wherein the super-resolution network is configured to increase a resolution of the radar data with the first resolution prior to the radar data being used to detect and identify the target in the path and the surrounding environment of the ego vehicle.

8. The autonomous driving system of claim 1, wherein the super-resolution network is configured to learn how to map a lower-resolution radar dataset that corresponds to the radar data with the first resolution into a higher-resolution radar dataset that corresponds to the radar data with the second resolution to facilitate identification of the target, and wherein the higher-resolution dataset includes features of a scene with greater granularity than that of the lower-resolution radar dataset.

9. The radar system of claim 8, wherein the super-resolution network comprises one or more convolutional neural networks that include up-sampling operators in one or more layers of the one or more convolutional neural networks to increase a resolution of the lower-resolution radar dataset to the higher-resolution radar dataset.

10. The radar system of claim 9, wherein the one or more convolutional neural networks comprises a contracting path configured to receive the lower-resolution radar dataset that serves as an input image tile and an expansive path configured to produce an output segmentation map that corresponds to the higher-resolution radar dataset.

11. The autonomous driving system of claim 1, wherein the radar system comprises:
an antenna module comprising one or more meta-structure antennas that are configured to radiate one or more transmission radio frequency (RF) beams to a target and receive one or more return RF beams reflected from a surrounding environment of the ego vehicle; and
a perception module coupled to the antenna module and configured to detect and identify one or more targets from the one or more return RF beams, wherein the perception module comprises one or more deep learning neural networks that are trained with first radar data with a first resolution and lidar data with a second resolution and configured to produce second radar data with a resolution that substantially corresponds to the second resolution of the lidar data.

12. The autonomous driving system of claim 11, wherein the one or more deep learning neural networks are trained with a training dataset that includes one or more image sets of the first radar data associated with first timestamp data and the lidar data associated with second timestamp data.

13. The autonomous driving system of claim 12, wherein the lidar data is time-synchronized with the radar data based at least on the first timestamp data being substantially equivalent in time with the second timestamp data.

14. The autonomous driving system of claim 12, wherein the one or more deep learning neural networks are trained to map the first radar data into the second radar data that substantially corresponds to a representation of the lidar data that is nearest in time to the first timestamp data.

15. A method of operating an autonomous driving system of an ego vehicle, the method comprising:
receiving first radar data with a first resolution that is gathered over a continuous field of view with a super-resolution network in a radar system configured to detect a target in a path and a surrounding environment of the ego vehicle;
generating second radar data with the super-resolution network, the second radar data having a second resolution different from the first resolution and corresponding to a ground truth densified dataset time-synchronized with a radar training dataset; and
identifying the detected target from the second radar data with the second resolution using one or more second neural networks.

16. The method of claim 15, further comprising:
directing a meta-structure antenna in the radar system to generate one or more radio frequency (RF) beams and to radiate the one or more RF beams to one or more targets in the path and surrounding environment of the ego vehicle;
providing the first radar data from one or more return RF beams that are reflected from the one or more targets, to the super-resolution network;
producing the second radar data with the second resolution different from the first radar data with the first resolution using one or more trained neural networks in the super-resolution network, wherein the super-resolution network is configured to learn how to map a lower-resolution radar dataset that corresponds to the first radar data with the first resolution into a higher-resolution radar dataset that corresponds to the second radar data with the second resolution to facilitate identification of the one or more targets; and
generating target identification information from the second radar data with the second resolution to identify the one or more targets.

17. The method of claim 16, further comprising:
obtaining the first radar data with associated first timestamp data from the radar system, wherein the first radar data is captured over the continuous field of view;
obtaining lidar data with associated second timestamp data from one or more lidar sensors;
associating the first radar data with a subset of lidar data from the lidar data that is substantially corresponding in time with the first radar data using the first timestamp data and the second timestamp data; and
forming a training dataset that includes the first radar data and the lidar data,
wherein the first radar data has a resolution that is lesser than that of the lidar data.

18. The method of claim 16, wherein the first radar data includes a coarse-resolution radar dataset that serves as input to the super-resolution network and the lidar data includes a fine-resolution lidar dataset that serves as an expected output of the super-resolution network, wherein the training dataset includes a coarse-resolution lidar dataset when the coarse-resolution radar dataset is not available.

19. The method of claim 16, further comprising:
densifying the lidar data in the training dataset based at least on the first radar data having a dense arrangement and the lidar data having a sparse point cloud arrangement to form the ground truth densified dataset;
mapping the ground truth densified dataset onto a three-dimensional perspective representation based at least on the field of view being subdivided into regularly spaced voxels of infinite height, wherein a value of each regularly spaced voxel corresponds to a difference in height between a highest point and lowest point within a bounds of the each regularly spaced voxel;
applying a random rotation to the training dataset to augment the training dataset; and
training the super-resolution network with the training dataset to map the first radar data into the lidar data.

20. The method of claim 19, wherein the super-resolution network is trained to map features of a coarse-resolution radar image from the first radar data into an output image having features that substantially correspond to features of a fine-resolution lidar image in the lidar data.

* * * * *